United States Patent [19]

Kuno

[11] Patent Number: 5,736,834
[45] Date of Patent: Apr. 7, 1998

[54] BATTERY CHARGER AND METHOD FOR COMPLETING CHARGING AT DESIGNATED TIME

[75] Inventor: Hiromichi Kuno, Aichi-Ken, Japan

[73] Assignee: Toyota Jidosha Kabushiki Kaisha, Toyota, Japan

[21] Appl. No.: 762,751

[22] Filed: Dec. 11, 1996

[30] Foreign Application Priority Data

Dec. 12, 1995 [JP] Japan .................. 7-323216

[51] Int. Cl.$^6$ .................. H01M 10/44; H01M 10/46
[52] U.S. Cl. .................. 320/22; 320/31
[58] Field of Search .................. 320/20, 21, 22, 320/27, 28, 30, 31, 32, 35, 39, 40

[56] References Cited

U.S. PATENT DOCUMENTS

| | | | |
|---|---|---|---|
| 5,350,995 | 9/1994 | Iketani | 320/20 X |
| 5,430,363 | 7/1995 | Kim | 320/31 X |
| 5,554,920 | 9/1996 | Kokuga | 320/22 |
| 5,606,240 | 2/1997 | Kokuga et al. | 320/32 |

FOREIGN PATENT DOCUMENTS 3-52523  3/1991  Japan .
4-93454  8/1992  Japan .

*Primary Examiner*—Edward Tso
*Attorney, Agent, or Firm*—Oblon, Spivak, McClelland, Maier & Neustadt, P.C.

[57] ABSTRACT

A battery charger and method for terminating charging at a designated time. After terminating first-stage constant-current charging by a first charging current, the charging is paused for to the designated charging termination time minus a second-stage constant-current charging duration. After the termination of the standby duration, second-stage constant-current charging is started and terminated at the charging termination time. The battery is not excessively charged but warmed up by heat generated by the battery itself at a stage close to the end of charging. When the standby duration is long, the second-stage constant-current charging duration is corrected according to the battery temperature or the temperature of the surrounding atmosphere. The invention can be applied to a charging method other than the two-stage constant-current charging.

6 Claims, 3 Drawing Sheets

BATTERY CHARGER AND METHOD FOR COMPLETING CHARGING AT DESIGNATED TIME

BACKGROUND OF THE INVENTION a) Field of the Invention

The invention relates to a device and method for charging batteries such as a lead acid battery, a NiCd (nickel-cadmium) battery, and a NiMH (nickel-metal hydride) battery.

b) Description of the Related Art

Japanese Patent Laid-Open Publication No. Hei 3-52523 discloses a problem that a battery forklift's acceleration is dull in cold mornings. This problem results from a substantial drop in the level of energy or power available from the battery at a low temperature (e.g., 10° C. or below) compared with normal temperature. Therefore, in this publication, a charger is operated by the following sequence utilizing heat generated by excessive charging: first, charging is performed by a relatively large current to raise the battery voltage to a prescribed value, the charging current is lowered to a low level and a first timer is activated at the same time, the charging is paused when the first timer has expired and a second timer is activated at the same time, charging by a relatively low current is started and a third timer is activated if the battery temperature or the temperature of the surrounding atmosphere is low when the second timer has expired, and the charging is completed when the third timer has expired. Two stage charging which is completed when the first timer expires is called main charging, and the follow-up charging performed when the third timer is on after the lapse of a prescribed time upon the completion of the main charging is called auxiliary charging.

In the above publication, the duration and charging current value of each charging step are determined so that the battery is fully charged or charged to a state close thereto by the main charging, and excessively charged by the auxiliary charging. By the above sequence, the battery can be recovered to a fully or excessively charged state regardless of whether it is warm or cold. Besides, since the battery is excessively charged and generates heat by the auxiliary charging, it is preliminarily warmed up by self-heating. As a result, the battery is in a state that high energy or power is available, and the above-described problem that a battery forklift's acceleration is dull in cold mornings is less likely to arise. However, the excessively charged state brought about by the auxiliary charging shortens the battery life. For example, a sealed type battery cannot be replenished with electrolytic solution, even when an electrolytic solution is vaporized due to the excessive charging. Accordingly, the warm-up charging reduces the amount of electrolytic solution, resulting in shortening the battery life.

SUMMARY OF THE INVENTION

One object of the invention is to enable the preliminary warming-up of a battery without excessively charging it. The invention achieves this object by completing the battery charging to a fully charged state immediately before start of using battery regardless of a battery or an atmosphere temperature. Another object of the invention is to compensate for self-discharge of the battery. To achieve this object, the invention adjusts various parameters for the preliminary warming-up according to a standby duration. Still another object of the invention is to enable charging in accordance with the temperature characteristic of the self-discharging of a battery. To achieve this object, the invention adjusts various parameters for the preliminary warming-up according to the battery temperature or the temperature of the surrounding atmosphere.

A first aspect of the invention is a battery charger which is provided with input means, first charging means, and second charging means. The input means are means for receiving the designation of a charging termination time (from a vehicle driver for example). The first charging means start to charge the battery after receiving the designation of the charging termination time and pause the charging before the battery is fully charged. The second charging means restart charging of the battery from a charging restart time determined on the basis of the designated charging termination time (e.g., so as to attain a fully charged state at the termination of charging) after the pause of charging by the first charging means and terminate the charging at a time when the battery is considered to have been fully charged. A second aspect of the invention is a battery charging method which has an input step, a first charging step, and a second charging step. The input step, the first charging step, and the second charging step are relevant to the input means, the first charging means, and the second charging means, respectively.

Therefore, the invention can terminate the charging of a battery at a designated charging completion time or a time close thereto. Further, when the charging is completed, the battery has been warmed up by heat generated by the battery itself at the end of a series of charging processes provided by the first and second charging means (or steps). In other words, at the designated charging termination time, the battery has been warmed up by the charging operation by the second charging means, and relatively high energy or power is available from the battery even in cold weather. Thus, the starting performance and acceleration performance of an electric vehicle in cold weather, for example, can be improved. Besides, since the battery is warmed up by the charging operation immediately before it is fully charged, the battery is not excessively charged, and its life is extended longer compared with the prior art. Furthermore, the invention can be achieved by a simple modification of inserting a standby duration between a first stage and a second stage of the conventionally known two-stage constant-current charging using time counting means.

It is preferable to provide a step or means for self-discharging compensating. When the standby duration from the pause of the charging by the first charging means or step to the restart of charging by the second charging means or step exceeds a prescribed time, the self-discharging compensating means or step corrects a charging time, a charging current, a charging voltage, a charging current amount or a charging power, or a combination thereof, using the second charging means or step, according to a length of the standby duration. Thus, the deteriorated state of charge of the battery due to the self-discharging caused during the standby duration is compensated for, and the battery is fully charged with relatively high accuracy. Further, it is preferable to provide a temperature detecting means or step and a correction level setting means or step. The temperature detecting means or step detects the battery temperature or the temperature of the surrounding atmosphere, and the correction level setting means or step sets a correction level related to the correction based on the detected temperature so that a temperature characteristic of the self-discharging of the battery is reflected in the correction. Thus, in this configuration, the battery temperature or the temperature of the surrounding atmosphere is reflected into the compensation of the self-discharging, leading to the compensation of the self-discharging with relatively high accuracy.

DETAILED DESCRIPTION OF THE PREFERRED EMBODIMENT

A preferred embodiment of the invention will be described with reference to the accompanying drawings.

Figure 1:
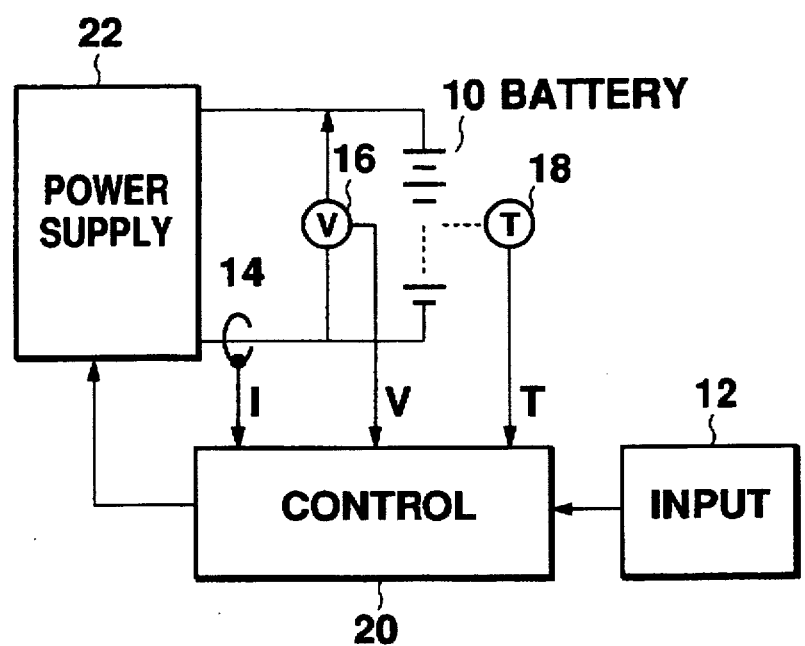
FIG. 1 is a block diagram showing the configuration of a battery charger according to one embodiment of the invention.

FIG. 1 shows the configuration of a battery charger according to one embodiment of the invention. An input section 12 is means for receiving from a user the designation of a charging termination time of a battery 10 (e.g., a time of starting an electric vehicle). Sensors 14, 16 and 18 detect a charging current, a charging voltage and a temperature (or an atmosphere temperature) of the battery 10, respectively. A controller 20 performs a prescribed charging control sequence according to the output of the input section 12 and the sensors 14, 16 and 18. A power supply 22 charges the battery 10 under the control of the controller 20. The power supply 22 is not shown in detail in FIG. 1, but those skilled in the art can readily configure the power supply 22 in view of the disclosure of the invention.

Figure 2:
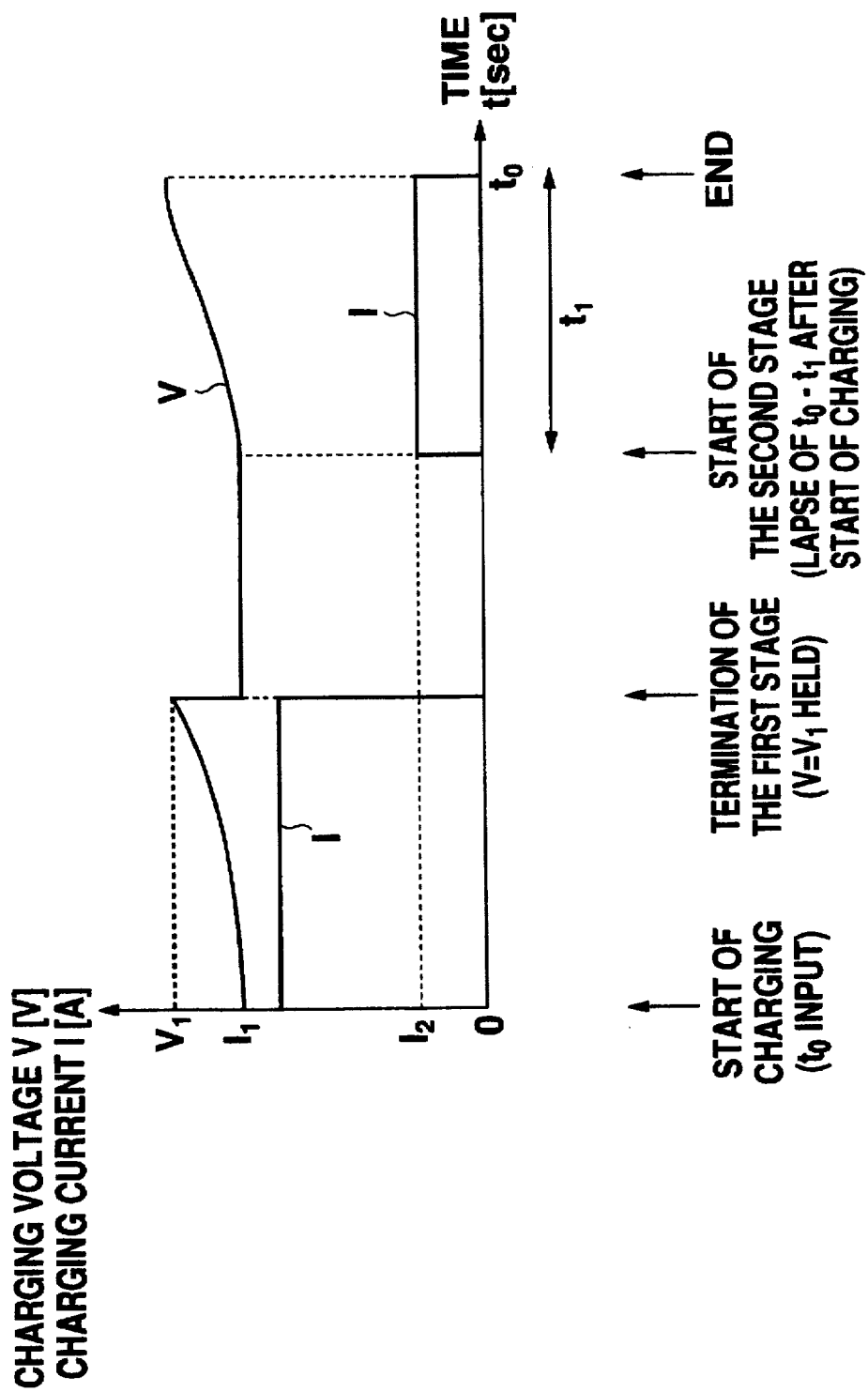
FIG. 2 is a timing chart showing the outline of the charging operation in the above embodiment.

FIG. 2 shows a charging sequence adopted in this embodiment, namely the control principle of the controller 20. The sequence shown in the figure is a modification of the conventionally known two-stage constant-current charging sequence. The conventional two-stage constant-current charging sequence was a sequence which sequentially and continuously conducted a first-stage constant-current charging step in which charging by a charging current I=I1 was performed until a charging voltage V rose to V1, and a second-stage constant-current charging step in which charging by a current I=I2 (I2<I1) was performed for a prescribed duration just after completing the first-stage constant-current charging step. In this embodiment, the second-stage constant-current charging step is started after waiting for a lapse of time t=t0−t1. Specifically, this embodiment has a standby duration of the charging current I=0 between the first-stage constant-current charging step and the second-stage constant-current charging step. The time t0 is a charging termination time determined by the user through the input 12, and the time t1 is a second-stage constant-current charging duration determined in correlation with the current I2 which is related to the second-stage constant-current charging.

In this embodiment, the charging sequence can be performed to fully charge the battery 10 at the charging termination time t0 designated by the user by adequately setting I2 and t2. Besides, the battery 10 generates heat when it is charged to almost a fully charged state though not heated so high that it is excessively charged, so that at the charging termination time t0 (an estimated time when the user will start to use the battery 10), the battery 10 is in a fully warmed-up state (e.g., 20° to 30° C.), namely relatively high energy or power is available. Therefore, when the battery 10 is used as the drive source for an electric vehicle, the electric vehicle can be started as desired in cold weather. Besides, since the battery 10 is not excessively charged in this embodiment, its life can be retained even when it is a sealed type lead acid battery, a NiCd battery, or a NiMH battery.

Figure 3:
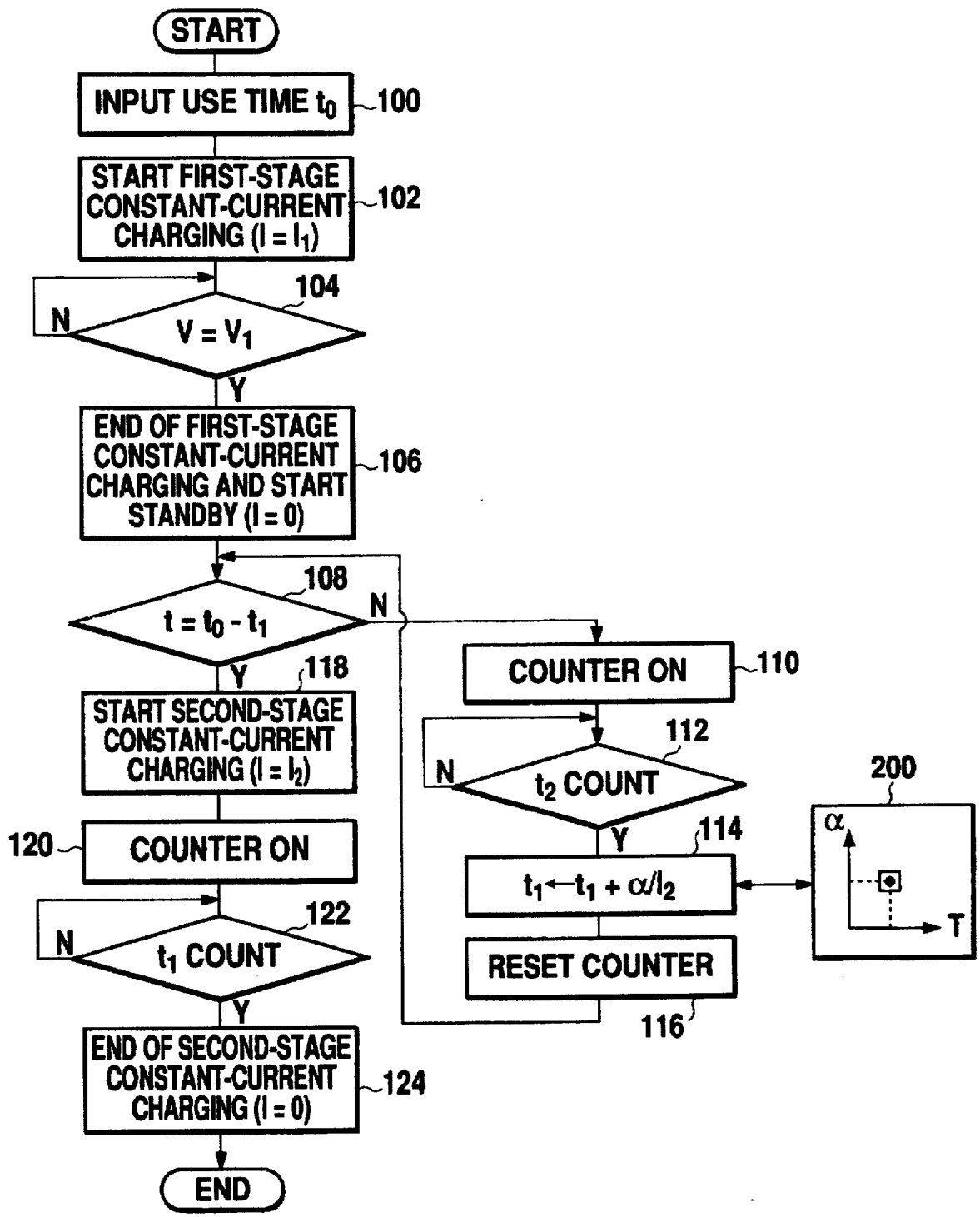
FIG. 3 is a flowchart showing the operation sequence of a control in the above embodiment.

FIG. 3 shows a control sequence to be performed by the controller 20 in order to achieve the charging operation shown in FIG. 2. The control 20 receives a charging termination time, namely a time t0 to use the battery 10, from the input 12 (100), starts the first-stage constant-current charging using the charging current I=I1 (102) and, when a charging voltage reaches a prescribed value V1 (104), terminates the first-stage constant-current charging (106). Then, a standby duration is started where the charging current I=0.

The control 20 repeats the operations of steps 110 through 116 until the standby duration is terminated, namely until the time t reaches a time t0−t1 (108). In other words, the controller 20 turns on a built-in counter (110), waits until the counter counts a prescribed threshold time t2 (112), refers to a self-discharging compensation table 200 to correct the second-stage constant-current charging duration t1 (114), and resets the counter and returns to step 108 (116). In step 114, a correction expression used is as follows:

$$t1 \leftarrow t1 + \alpha/t2$$

and, the self-discharging compensation table 200 is a table for correlating a temperature T detected by the sensor 18 and the correction coefficient α used in the above expression. Accordingly, the second-stage constant-current charging duration t1 can be corrected so as to be extended according to the temperature characteristic of the self-discharging of the battery 10, so that the battery 10 can be fully charged desirably at the time of the second-stage constant-current charging completion, namely at the charging completion time t0.

When t=t0−t1, namely the approach of a time to start the second-stage constant-current charging, is detected, the controller 20 starts the second-stage constant-current charging using the charging current I=I2 (118) and, when a second-stage constant-current charging execution time being counted by the built-in counter reaches the second-stage constant-current charging duration t1 (120, 122), terminates the second-stage constant-current charging and sets the charging current I=0 (124).

Thus, in this embodiment, the battery 10 can be warmed up by charging without excessively charging and by utilizing heat generated at a stage close to the end of charging. The above description has been made on the assumption that the invention is applied to the two-stage constant-current charging, but the invention can also be applied to multi-stage constant-current charging and single-stage constant-current charging. Besides, the invention can also be applied to constant-voltage charging and constant-power charging. Adoption of whichever charging method may be determined according to the type of battery 10. Furthermore, the charging was paused when the first-stage constant-current charging was completed and the second-stage constant-current charging was started in the above embodiment, but the pause and restart timing of charging can be determined voluntarily by a designer. In addition, the second-stage constant-current charging duration t1 was corrected when the standby duration exceeded the threshold time t2 in the above embodiment, but the correction may be made without waiting for the lapse of the threshold time t2, and the parameter to be corrected is not limited to the time t1. In other words, in addition to the charging time, various parameters such as a charging current, a charging voltage, a charging current amount and a charging power can be corrected though variable depending on the charging method.

While there has been described that what is at present considered to be a preferred embodiment of the invention, it is to be understood that various modifications may be made thereto, and it is intended that the appended claims cover all such modifications as fall within the true spirit and scope of the invention.

What is claimed is:

1. A battery charger comprising:

input means for receiving designation of a charging termination time, first charging means for starting to charge a battery after receiving the designation of the charging termination time, means for pausing charging by said first charging means before said battery is fully charged, second charging means for restarting charging of said battery from a charging restart time determined on the basis of said designated charging termination time after the pause of charging by said first charging means, and means for terminating said charging by said second charging means at a time when said battery is considered to be fully charged, wherein the charging of the battery which generates heat at the end of a series of charging processes provided by said first and second charging means is terminated at the designated charging termination time or at a time close to said charging termination time.

2. The battery charger according to claim 1 further comprising:

self-discharging compensation means for correcting a physical quantity specifying a charging operation by said second charging means, according to a length of a standby duration, when the standby duration for a restart of charging by said second charging means after a pause of charging by said first charging means exceeds a prescribed time.

3. The battery charger according to claim 2 further comprising:

means for counting an elapsed time from the pause of charging by said first charging means to a current time, and means for comparing a counted elapsed time and said prescribed time.

4. The battery charger according to claim 2 further comprising:

temperature detecting means for detecting a battery temperature or the surrounding atmosphere temperature, and correction level setting means for setting said physical quantity based on a detected temperature so that a temperature characteristic of self-discharging of said battery is reflected in said correction.

5. The battery charger according to claim 4, wherein said physical quantity is any one or a combination of a charging time, a charging current, a charging voltage, a charging current amount and a charging power by said second charging means.

6. A battery charging method comprising:

an input step of receiving designation of a charging termination time, a first charging step of starting to charge a battery after performing the input step, pausing charging before said battery is fully charged, a second charging step of restarting charging of said battery from a charging restart time determined on the basis of said designated charging termination time after performing said first charging step, and terminating said charging at a time when said battery is considered to be fully charged, wherein, the charging of the battery which generates heat at the end of a series of charging processes provided by said first and second charging steps is terminated at the designated charging termination time or at a time close to said designated charging termination time.

* * * * *